(12) United States Patent
Kaulmann et al.

(10) Patent No.: US 12,212,433 B2
(45) Date of Patent: Jan. 28, 2025

(54) METHOD FOR COMMUNICATION BETWEEN A FIRST PASSIVE SUBSCRIBER AND A SECOND PASSIVE SUBSCRIBER OF A BUS SYSTEM

(71) Applicant: BECKHOFF AUTOMATION GMBH, Verl (DE)

(72) Inventors: Tim Kaulmann, Paderborn (DE); Erik Vonnahme, Salzkotten (DE)

(73) Assignee: Beckhoff Automation GmbH, Verl (DE)

( * ) Notice: Subject to any disclaimer, the term of this patent is extended or adjusted under 35 U.S.C. 154(b) by 215 days.

(21) Appl. No.: 18/178,141

(22) Filed: Mar. 3, 2023

(65) Prior Publication Data

US 2023/0208677 A1 Jun. 29, 2023

Related U.S. Application Data

(63) Continuation of application No. PCT/EP2021/076584, filed on Sep. 28, 2021.

(30) Foreign Application Priority Data

Sep. 29, 2020 (DE) .................. 10 2020 125 391.5

(51) Int. Cl.
  *H04L 12/407* (2006.01)
(52) U.S. Cl.
  CPC .................. *H04L 12/407* (2013.01)
(58) Field of Classification Search
  CPC .............. H04L 12/407; H04L 12/40084
  See application file for complete search history.

(56) References Cited

U.S. PATENT DOCUMENTS

| 7,343,535 B2 * | 3/2008 | Lai ................. G11C 29/48 |
| | | 714/724 |
| 7,650,450 B2 | 1/2010 | Soriano et al. |

(Continued)

FOREIGN PATENT DOCUMENTS

| CN | 111262655 A | 6/2020 |
| DE | 102005060903 A1 | 11/2006 |

(Continued)

OTHER PUBLICATIONS

"EtherCAT—The Ethernet Fieldbus," EtherCAT Technology Group, Mar. 2020, 25 pages., Mar. 1, 2020.

(Continued)

*Primary Examiner* — Jay P Patel
(74) *Attorney, Agent, or Firm* — Dorsey & Whitney LLP

(57) ABSTRACT

A method is provided for communicating between passive subscribers of a bus system. A first passive subscriber encodes an original static pattern in a first transmit SERDES element and encodes original user data in a time-synchronized manner with the original static pattern in a second transmit SERDES element. The second passive subscriber receives the encoded static pattern and user data, and generates a sampling clock having a first phase offset and a clock synchronous with a transmit-receive clock having a second phase offset, from the encoded static pattern. The second passive subscriber decodes the encoded static pattern using a first receive SERDES element and the encoded user data, using a second receive SERDES element to obtain a receive data word. The first receive SERDES element and the second receive SERDES element are operated based on the sampling clock, and the receive data word is output synchronously with the synchronous clock.

15 Claims, 3 Drawing Sheets

(56) References Cited

U.S. PATENT DOCUMENTS

| | | | |
|---|---|---|---|
| 7,668,979 B1* | 2/2010 | Wentzlaff | G06F 13/4022 710/33 |
| 8,320,437 B2 | 11/2012 | Hartwich et al. | |
| 8,498,370 B2 | 7/2013 | Haas et al. | |
| 9,184,834 B1* | 11/2015 | Zhang | H04B 10/50577 |
| 9,749,162 B1* | 8/2017 | Mobin | H04L 25/03057 |
| 9,917,709 B2* | 3/2018 | Mobin | H04L 25/03057 |
| 11,379,580 B1* | 7/2022 | Wesselkamper | G11C 17/18 |
| 2005/0160328 A1* | 7/2005 | Lesartre | H04L 1/245 714/48 |
| 2005/0251595 A1* | 11/2005 | Lesartre | H04L 1/0061 710/71 |
| 2009/0063889 A1* | 3/2009 | Dada | H04L 25/14 713/503 |
| 2015/0215853 A1* | 7/2015 | Ling | H04W 64/003 370/254 |
| 2015/0261158 A1* | 9/2015 | Miyadera | G03G 15/50 358/1.1 |
| 2016/0006235 A1 | 1/2016 | Wang | |
| 2018/0048494 A1* | 2/2018 | Mobin | H04L 25/06 |
| 2019/0260380 A1 | 8/2019 | Carlough et al. | |
| 2019/0383873 A1* | 12/2019 | Hojabri | G01R 31/3187 |
| 2021/0248031 A1* | 8/2021 | McLaren | G06F 11/1048 |
| 2022/0107903 A1 | 4/2022 | Mutter et al. | |
| 2022/0122397 A1* | 4/2022 | Cristache | B25J 9/1617 |
| 2022/0291666 A1* | 9/2022 | Cella | B25J 9/163 |
| 2022/0366494 A1* | 11/2022 | Cella | H04L 9/50 |
| 2022/0374306 A1* | 11/2022 | McLaren | G06F 11/1032 |

FOREIGN PATENT DOCUMENTS

| | | |
|---|---|---|
| EP | 1650670 A1 | 4/2006 |
| WO | 2020156919 A1 | 8/2020 |

OTHER PUBLICATIONS

International Search Report and Written Opinion dated Apr. 1, 2022 in connection with International patent application No. PCT/EP2021/076584, 22 pages including English translation.

Office Action dated Apr. 12, 2021 in connection with German patent application No. 10 2020 125 391.5, 7 pages Including English translation.

International Preliminary Report on Patentability dated Dec. 16, 2022 in connection with International patent application No. PCT/EP2021/076584, 28 pages including English translation.

* cited by examiner

METHOD FOR COMMUNICATION BETWEEN A FIRST PASSIVE SUBSCRIBER AND A SECOND PASSIVE SUBSCRIBER OF A BUS SYSTEM

CROSS-REFERENCE TO RELATED APPLICATIONS

This patent application is a continuation of International Patent Application No. PCT/EP2021/076584, filed Sep. 28, 2021, titled "Method for Communicating between a First Passive Subscriber and a Second Passive Subscriber of a Bus System," which claims the priority of German patent application DE 10 2020 125 391.5, filed Sep. 29, 2020, titled "Verfahren zur Kommunikation zwischen einem ersten passiven Teilnehmer and einem zweiten passiven Teilnehmer eines Bussystems," each of which is incorporated by reference herein, in the entirety and for all purposes.

FIELD

The invention relates to a method for communicating between a first passive subscriber and a second passive subscriber of a bus system. Furthermore, the invention relates to the passive subscribers between which communication may take place and to the bus system as a whole.

BACKGROUND

Prior art bus systems are known in which data telegrams may be exchanged between subscribers. In such bus systems, decentrally arranged devices, e.g. of a machine periphery, such as I/O modules, transducers, drives, valves and operator connections may communicate with automation, engineering or visualization systems via a powerful real-time communication system. All devices are networked with one another via a serial bus, preferably a field bus, wherein data exchange via the bus is usually based on the master-slave principle.

Active subscribers in the bus system are control devices. They have a bus access authorization and determine the data transfer on the bus. The active subscribers are also referred to as master devices in the serial bus system.

Passive subscribers, on the other hand, are usually the machine periphery devices. They are not given bus access authorization, i.e. they may only acknowledge received messages or transmit messages to an active subscriber at its request. Passive subscribers are therefore also referred to as slave devices in the serial bus system.

The master devices generally contain a field bus interface which represents the link between the central data processing in the master device and the field bus network and which performs the bus management. The complete bus protocol is therefore also implemented in the field bus interface, which is often embodied as a separate module. The slave devices in turn comprise an interface module that converts the data from the slave device into the data format of the field bus system. These interface modules thus also only require a small part of the bus protocol.

A key aspect in the design of such a bus system is to allow for communication between passive subscribers, e.g. in order to be able to pass on a data telegram from a first passive subscriber to a second passive subscriber. This makes it possible to massively reduce the amount of wiring or cabling required in the bus system. Typically, this communication takes place via a differential double line over which the data telegram is transmitted. The maximum transmission speed in such a bus system is limited, e.g. to 100 Mbit. For example, U.S. Pat. No. 8,498,370 B2 discloses a communication method based on a differential double line.

SUMMARY

The present invention increases the maximum transmission speed between passive subscribers and provides a suitable method, suitable passive subscribers and a suitable bus system for this purpose.

EXAMPLES

According to a first aspect, a method for communicating between a first passive subscriber and a second passive subscriber of a bus system is embodied in such a way that a first differential double line and a second differential double line are used for the communication. An original static pattern with a predetermined bit length is transmitted via the first differential double line, wherein the original static pattern defines a transmit-receive clock. Original user data is transmitted over the second differential double line, the original user data comprising a transmit data word having the predetermined bit length.

The first passive subscriber encodes the original static pattern in a first transmit SERDES (serializer/deserializer) element and transmits the encoded static pattern to the second passive subscriber over the first differential double line. Furthermore, the first passive subscriber encodes the original user data synchronized in time with the original static pattern in a second transmit SERDES element and transmits the encoded user data to the second passive subscriber via the second differential double line.

The second passive subscriber receives the encoded static pattern and the encoded user data and generates a sampling clock and a clock synchronous to the transmit-receive clock from the encoded static pattern, the sampling clock having a first phase offset from the transmit-receive clock and the synchronous clock having a second phase offset from the transmit-receive clock. The second passive subscriber decodes the encoded static pattern with the aid of a first receive SERDES element and the encoded user data with the aid of a second receive SERDES element to obtain a receive data word. In this process, the first receive SERDES element and the second receive SERDES element are operated based on the sampling clock and the receive data word is output synchronously with the synchronous clock.

The first differential double line and the second differential double line may be embodied as conductor paths on a circuit board. In this case, the first passive subscriber and the second passive subscriber may also be arranged on the circuit board. The first differential double line and the second differential double line may also be routed via connections and each comprise a double cable, so that the first passive subscriber and the second passive subscriber are arranged in different housings. In this case, the transmit data word may comprise a bit sequence with the predetermined bit length, which is transmitted by the first passive subscriber. The receive data word may comprise a bit sequence with the predetermined bit length, which is received by the second passive subscriber. In order to retrieve the bit sequence of the receive data word, it may be provided that the receive data word is decoded with a time offset based on the static pattern.

By providing the first differential double line, via which the original static pattern is transmitted, an additional communication channel is thus provided, via which a clock signal may be transmitted, compared with conventional systems, in which only one communication channel in the form of a differential double line is used for the transmission of the user data. This means that the method is also suitable for high transmission rates, since the synchronous output of the encoded static pattern and the transmit data word by the first subscriber enables the second passive subscriber to perform a synchronous assignment of the receive data word and the encoded static pattern. It may be provided that for this purpose lengths of individual lines of the first differential double line and the second differential double line differ from each other by a predetermined length at most, the predetermined length resulting from a desired transmission rate and a signal propagation speed in the differential double lines.

It may be provided that at least one gigabit per second, in particular 1.25 Gbit/s, is transmitted via the first differential double line and at least one gigabit per second, in particular 1.25 Gbit/s, is transmitted via the second differential double line. For this case, it may be provided that the lengths of the individual lines of the first differential double line and the second differential double line deviate from each other by a maximum of 3 centimeters, e.g. if the first differential double line and the second differential double line are embodied as conductor paths on a circuit board.

According to a second aspect, a first passive subscriber of a bus system is set up to execute those method steps that are executed by the first passive subscriber.

For this purpose, the first passive subscriber of the bus system may have a first transmit connection for a first differential double line, a second transmit connection for a second differential double line, a first transmit SERDES element and a second transmit SERDES element and be set up to encode an original static pattern with a predetermined bit length in the first transmit SERDES element and to transmit it as an encoded static pattern via the first transmit connection. The original static pattern thereby defines a transmit-receive clock. The first passive subscriber is further arranged to encode original user data synchronized in time with the original static pattern in the second transmit SERDES element and to transmit it as encoded user data via the second transmit connection. The original user data comprises a transmit data word with the specified bit length.

According to a third aspect, a second passive subscriber of a bus system is set up to execute those method steps which are executed by the second passive subscriber.

For this purpose, the second passive subscriber of the bus system may have a first receive connection for a first differential double line, a second receive connection for a second differential double line, a first receive SERDES element and a second receive SERDES element. The second passive subscriber is set up to receive an encoded static pattern having a predetermined bit length via the first receive connection, and to receive encoded user data having the predetermined bit length via the second receive connection. Furthermore, the second passive subscriber is set up to generate a sampling clock and a clock synchronous to a transmit-receive clock from the encoded static pattern, the sampling clock having a first phase offset from the transmit-receive clock and the synchronous clock having a second phase offset from the transmit-receive clock. The second passive subscriber is further set up to decode the encoded static pattern using the first receive SERDES element and to decode the encoded user data using the second receive SERDES element, thereby obtaining a receive data word. In this regard, the first receive SERDES element and the second receive SERDES element may be operated based on the sampling clock, and the receive data word may be output synchronously with the synchronous clock.

According to a fourth aspect, a bus system has a first passive subscriber according to the invention and a second passive subscriber according to the invention. The bus system may further comprise an active subscriber, i.e., a controller. In particular, the first passive subscriber and the second passive subscriber may be jointly arranged with the first differential double line and the second differential double line on a printed circuit board, wherein the printed circuit board may be a PCB (printed circuit board). In this case, the first differential double line and the second differential double line may be embodied as conductor paths.

It may be provided that the second passive subscriber is also arranged to communicate with the first passive subscriber via a further first differential double line and a further second differential double line, using the described method for a communication from the second passive subscriber to the first passive subscriber.

BRIEF DESCRIPTION OF THE DRAWINGS

The invention will be discussed in more detail below with the aid of embodiments and examples, and with reference to figures. Here, in a schematic illustration in each case.

DETAILED DESCRIPTION

Figure 1:
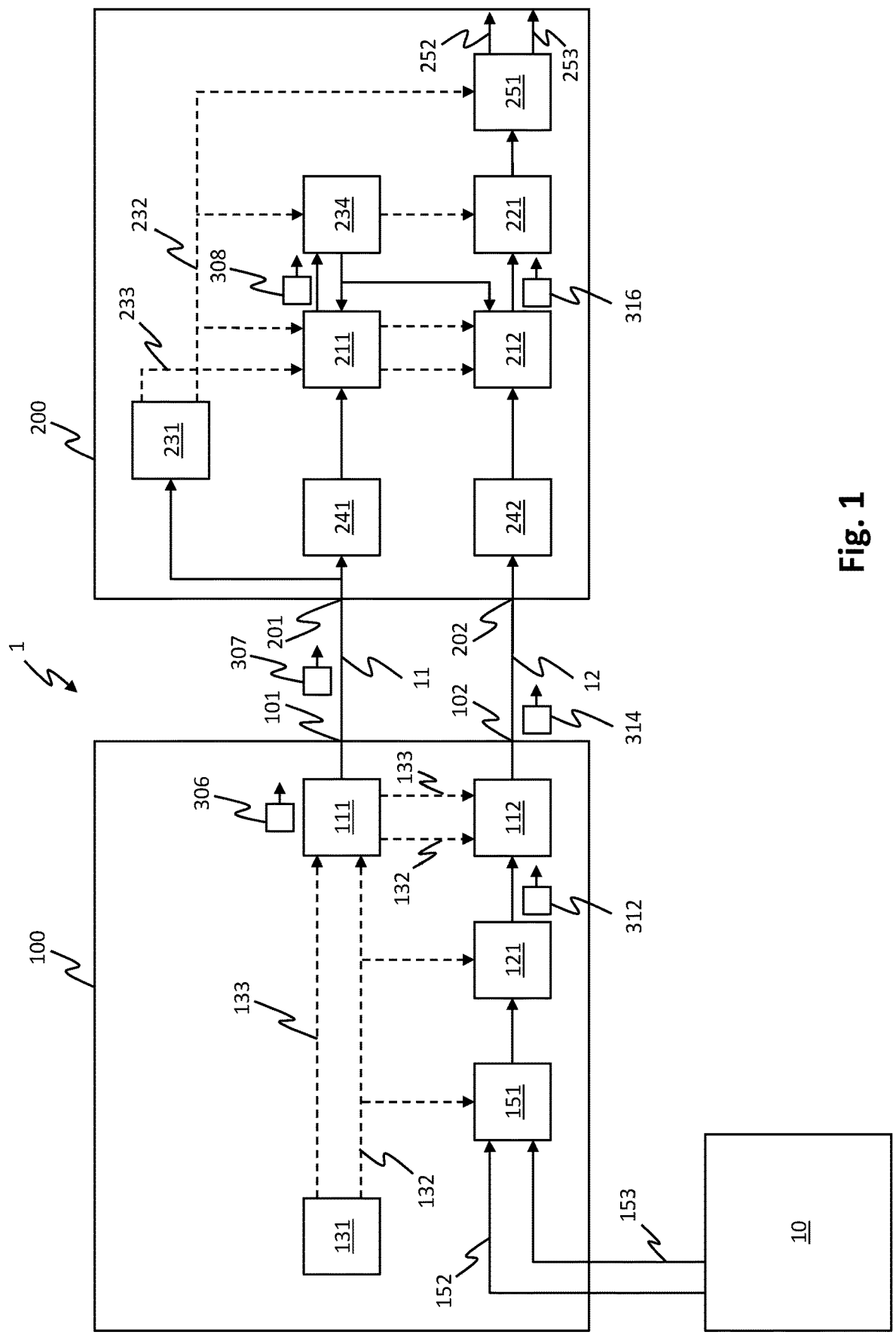
FIG. 1 shows a bus system.

In an embodiment of the method, the transmit-receive clock corresponds to one tenth of a data rate transmitted via the first differential double line and via the second differential double line, respectively. Thus, an advantageous ratio of the predetermined bit length and the sampling clock is achieved.

In an embodiment of the method, the sampling clock corresponds to the data rate transmitted via the first differential double line or via the second differential double line, respectively, or to half of the data rate transmitted via the first differential double line or via the second differential double line, respectively. These two ratios provide an advantageous ratio of data rate to sampling clock.

In an embodiment of the method, the first phase offset is 90 degrees. This allows the receive data word to be scanned in one data eye.

In an embodiment of the method, the second phase offset is 18 degrees. This allows the receive data word to also be scanned in one data eye.

In an embodiment of the method, the static pattern comprises a first number of first bits with bit value 1 and a second number of second bits with bit value 0. In the static pattern, the first bits are arranged first and then the second bits, wherein the first number and the second number jointly correspond to the bit length. This allows for easy transmission of the static pattern. It may be provided that the first number and the second number are identical and thus each correspond to half the bit length.

In an embodiment of the method, the static pattern decoded by the first receive SERDES element is shifted with the aid of a first shift register until the original static pattern is output at an output of the first receive SERDES element. The receive data word decoded by the second receive SERDES element is shifted by a number of bits identical to the first shift register with the aid of a second shift register. This allows a rough adjustment of the transmissions.

In an embodiment of the method, the encoded static pattern in the second passive subscriber is delayed by a first delay element and the encoded user data is delayed by a second delay element. During an initialization, the delay of each of the first delay element and the second delay element is first gradually reduced and checked to see whether a sampled clock pattern changes. Thus, a lower limit for the delay is determined. In particular, the lower limit is obtained when the clock pattern changes. Subsequently, the delay of the first delay element and the second delay element is increased stepwise, respectively, and a check is carried out as to whether a sampled clock pattern changes.

Thus, an upper limit for the delay is determined. In particular, the upper limit is obtained when the clock pattern changes. Subsequently, the delay of the first delay element and the second delay element is set to an average value of the lower limit and the upper limit. Thus, it may be achieved that sampling takes place at an optimal time. This makes fine adjustment possible. The fine adjustment and the rough adjustment described further above may be performed in any order. An alternative possibility is to set the sampling offset by half a period from the known lower or upper limit when a period of the clock pattern and a lower limit or an upper limit of the clock pattern are known.

In an embodiment of the method, the user data is encoded and decoded using 8b10b encoding, wherein the predetermined bit length corresponds to 10 bits. This allows for robust communication in which a number of ones of the transmit data words differs from a number of zeros by a maximum of two in each case, i.e. the transmit data words contain four ones and six zeros, five ones and five zeros or six ones and four zeros. This allows 8 bits to be encoded and additional control words to be transmitted.

In an embodiment of the first passive subscriber, it is set up to transmit at least one gigabit per second, in particular 1.25 Gbit/s, via the first differential double line and at least one gigabit per second, in particular 1.25 Gbit/s, via the second differential double line.

In an embodiment of the first passive subscriber, the transmit-receive clock rate corresponds to one-tenth of a data rate transmitted over the first differential double line and over the second differential double line, respectively.

In an embodiment of the first passive subscriber, the original static pattern comprises a first number of first bits having a bit value of 1 and a second number of second bits having a bit value of 0. In the static pattern, the first bits are arranged first and then the second bits are arranged, wherein the first number and the second number together correspond to the bit length.

In an embodiment of the first passive subscriber, it is set up to encode the original user data using 8b10b coding, wherein the bit length is 10 bits.

In an embodiment of the second passive subscriber, the transmit-receive clock rate corresponds to one-tenth of a data rate transmitted over the first differential double line and over the second differential double line, respectively.

In an embodiment of the second passive subscriber, the sampling rate is equal to the data rate transmitted over the first differential dual line or over the second differential dual line, respectively, or half the data rate transmitted over the first differential dual line or over the second differential dual line, respectively.

In an embodiment of the second passive subscriber, the first phase offset is 90 degrees. In an embodiment of the second passive subscriber, the second phase offset is 18 degrees.

In an embodiment of the second passive subscriber, the encoded static pattern comprises a first number of first bits with bit value 1 and a second number of second bits with bit value 0. In the static pattern, the first bits are arranged first and then the second bits are arranged second.

In an embodiment of the second passive subscriber, the second passive subscriber is set up to shift the static pattern decoded by the first receive SERDES element with the aid of a first shift register until the original static pattern is output at an output of the first receive SERDES element and to shift the receive data word decoded by the second receive SERDES element by a number of bits identical to the first shift register with the aid of a second shift register.

In an embodiment of the second passive subscriber, the second passive subscriber further comprises a first delay element between the first receive input and the first receiver SERDES element and a second delay element between the second receive input and the second receiver SERDES element. The second passive subscriber is set up to delay the encoded static pattern with the aid of the first delay element and to delay the encoded user data with the aid of the second delay element. The second passive subscriber is further set up, upon initialization, to first gradually reduce the delay of the first delay element and the second delay element and to check whether a sampled clock pattern changes, thereby determining a lower limit for the delay and then gradually increasing the delay of the first delay element and the second delay element and checking whether a sampled clock pattern changes, thereby determining an upper limit for the delay. Furthermore, the second passive device is set up to subsequently set the delay of the first delay element and the second delay element to an average value of the lower limit and the upper limit.

In an embodiment of the second passive subscriber, it is set up to decode the encoded user data using 8b10b encoding, wherein the predetermined bit length is 10 bits.

In an embodiment of the bus system, the second passive subscriber comprises a further first transmit connection for a further first differential double line, a further second transmit connection for a further second differential double line, a further first transmit SERDES element and a further second transmit SERDES element. The second passive subscriber is set up to encode a further original static pattern comprising the predetermined bit length in the further first transmit SERDES element and to transmit it via the further first transmit connection as a further encoded static pattern, the further original static pattern defining a further transmit-receive clock. Furthermore, the second passive subscriber is set up to encode further original user data synchronized in time with the further original static pattern in the further second transmit SERDES element and to transmit it via the further second transmit connection as further encoded user data, the further original user data comprising a further transmit data word having the predetermined bit length.

The first passive subscriber comprises a further first receive connection for the further first differential double line, a further second receive connection for the further second differential double line, a further first receive SERDES element and a further second receive SERDES element. The first passive subscriber is set up to receive the further encoded static pattern via the further first receive connection, and to receive the further encoded user data via the further second receive connection. The first passive subscriber is further set up to generate a further sampling clock and a clock further synchronous to the further transmit-receive clock from the further encoded static pattern, the further sampling clock having a further first phase offset to the further transmit-receive clock and the further synchronous clock having a further second phase offset to the further transmit-receive clock. The first passive subscriber is further arranged to decode the further encoded static pattern with the aid of the further first receive SERDES element, and to decode the further encoded user data with the aid of the further second receive SERDES element, thereby obtaining a further receive data word. The first passive device is set up to operate the further first receive SERDES element and the further second receive SERDES element with the aid of the further sampling clock and to output the further receive data word synchronously with the further synchronous clock.

FIG. 1 shows a first passive subscriber 100 and a second passive subscriber 200 of a bus system 1, wherein an active subscriber 10 of the bus system 1 is furthermore shown. The first passive subscriber 100 comprises a first transmit connection 101 for a first differential double line 11 and a second transmit connection 102 for a second differential double line 12. Furthermore, the first passive subscriber 100 comprises a first transmit SERDES element 111 and a second transmit SERDES element 112. The first differential double line 11 and the second differential double line 12 connect the first passive subscriber 100 to the second passive subscriber 200. The second passive subscriber 200 comprises a first receive connection 201 for the first differential dual line 11 and a second receive connection 202 for the second differential dual line 12. Furthermore, the second passive subscriber 200 comprises a first receive SERDES element 211 and a second receive SERDES element 212.

The first transmit SERDES element 111 may also be referred to as a first parallel-to-serial converter. The second transmit SERDES element 112 may also be referred to as a second parallel-to-serial converter. The first receive SERDES element 211 may also be referred to as a first serial-to-parallel converter. The second receive SERDES element 212 may also be referred to as a second serial-to-parallel converter.

The first passive subscriber 100 is set up to encode an original static pattern 306 having a predetermined bit length in the first transmit SERDES element 111 and transmit it as an encoded static pattern 307 via the first transmit connection 101. The original static pattern 306 defines a transmit-receive clock 301. Furthermore, the first passive subscriber 100 is set up to encode original user data 312 synchronized in time with the original static pattern 306 in the second transmit SERDES element 112 and transmit it via the second transmit connection 102 as encoded user data 314, the original user data 312 comprising a transmit data word 311 having the predetermined bit length.

The second passive subscriber 200 is set up to receive an encoded static pattern 307 having a predetermined bit length via the first receive connection 201, and to receive encoded user data 314 having the predetermined bit length via the second receive connection 202. Furthermore, the second passive subscriber 200 is set up to generate, from the encoded static pattern 307, a sampling clock 302 and a clock 303 synchronous with a transmit-receive clock 301, wherein the sampling clock 302 has a first phase offset from the transmit-receive clock 301 and the synchronous clock 303 has a second phase offset from the transmit-receive clock 301. Furthermore, the second passive subscriber 200 is set up to decode the encoded static pattern 307 using the first receive SERDES element 211 to obtain a decoded static pattern 308 and is further arranged to decode the encoded user data 314 using the second receive SERDES element 212 to obtain a receive data word as part of decoded user data 316. The first receive SERDES element 211 and the second receive SERDES element 212 may be operated based on the sampling clock 302, and the receive data word may be output synchronously with the synchronous clock 303.

In a method for communicating between the first passive subscriber 100 and the second passive subscriber 200 of the bus system 1, the first differential double line 11 and the second differential double line 12 are used for communication. An original static pattern 306 having a predetermined bit length is transmitted via the first differential double line 11. The original static pattern 306 defines a transmit-receive clock 301. Original user data 312 are transmitted over the second differential double line 12. The original user data 312 include a transmit data word 311 having the predetermined bit length.

The first passive subscriber 100 encodes the original static pattern 306 in a first transmit SERDES element 111 and transmits it as an encoded static pattern 307 to the second passive subscriber 200 via the first differential double line 11. Furthermore, the first passive subscriber 100 encodes the original user data 312 synchronized in time with the original static pattern 306 in a second transmit SERDES element 112 and transmits it as an encoded user data 314 to the second passive subscriber 200 via the second differential double line 12. The second passive subscriber 200 receives the encoded static pattern 307 and the encoded user data 314 and generates a sampling clock 302 and a clock 303 synchronous to the transmit-receive clock 301 from the encoded static pattern 307.

The sampling clock 302 has a first phase offset with regard to the transmit-receive clock 301. The synchronous clock 303 exhibits a second phase offset with regard to the transmit-receive clock 301. The second passive subscriber 200 decodes the encoded static pattern 307 using a first receive SERDES element 211 the encoded user data 314 using a second receive SERDES element 212 to obtain a receive data word. The first receive SERDES element 211 and the second receive SERDES element 212 are operated based on the sampling clock 302, and the receive data word is output synchronously with the synchronous clock 303.

It may be provided that at least one gigabit per second, in particular 1.25 Gbit/s, may be transmitted via the first differential double line 11 and at least one gigabit per second, in particular 1.25 Gbit/s, may be transmitted via the second differential double line 12. It may be provided that the transmit-receive clock rate 301 corresponds to one tenth of a data rate transmitted via the first differential double line 11 and via the second differential double line 12, respectively. Thus, it may be provided that 1.25 Gbit/s are transmitted via the first differential double line 11 or the second differential double line 12, respectively, and the transmit-receive clock 301 corresponds to 125 MHz, i.e. 125 Mbit/s.

Further elements of the first passive subscriber 100 and the second passive subscriber 200 are described below, which are optional and further form the described bus system 1. The first passive subscriber 100 comprises an encoding unit 121 with the aid of which the user data 310 may be encoded. It may be provided to use a so-called 8b10b coding, in which 8 information bits are encoded by 10 line bits. The predetermined bit length then corresponds to 10 bits, so that the static pattern also comprises 10 bits. In particular, an information comprising 8 bits is converted into a transmit data word 311 comprising 10 bits in such a way that the transmit data word 311 comprises at least four 1-bits and at most six 1-bits. The second passive subscriber 200 has a decoding unit 221 with the aid of which the user data 310 may be decoded analogously to the coding unit 121 and e.g. the information comprising 8 bits may be obtained again from the receive data word comprising 10 bits.

It may be provided that the first passive subscriber 100 comprises a first phase controller 131. The first phase controller 131 may be arranged to output the transmit-receive clock 301. In particular, the transmit-receive clock 301 will be output to the first transmit-SERDES element 111 with the aid of a first clock line 132. Furthermore, the transmit-receive clock 301 may be output from the first transmit-SERDES element 111 to the second transmit-SERDES element 112 via the first clock line 132. Furthermore, the transmit-receive clock 301 may also be forwarded to the encoding unit 121 via the first clock line 132. The first phase controller 131 may be configured as a PLL. Furthermore, the first phase controller 131 may be set up to output, via a second clock line 133, a data clock corresponding to the transmission rate of the first differential double line 11 and the second differential double line 12, respectively. Alternatively, the first phase controller 131 may be set up to output, via the second clock line 133, a data clock having a data rate corresponding to half the transmission rate of the first differential double line 11 and of the second differential double line 12, respectively. In the first case, the individual bits to be transmitted may be transmitted on each rising edge 304 (shown in FIG. 2) of the data clock. In the second case, the individual bits to be transmitted may be transmitted on each rising edge 304 and each falling edge 305 (shown in FIG. 2) of the data clock.

It may be provided that the static pattern comprises a first number of first bits with bit value 1 and a second number of second bits with bit value 0. In the static pattern, the first bits are arranged at first and then the second bits, the first number and the second number in combination corresponding to the bit length. In particular, if the bit length is ten, the static pattern may take the following forms:

1000000000
1100000000
1110000000
1111000000
1111100000
1111110000
1111111000
1111111100
1111111110.

In principle, it is also possible to change the static pattern, thus a total of nine different pieces of information may be transmitted. It may be provided that the transmit-receive clock 301 output via the first clock line 132 is in each case synchronous with the start of the static pattern.

In an embodiment, the first number and the second number are identical. In this case, which in the above example corresponds to the static pattern 1111100000 with five ones and five zeros, the transmit-receive clock 301 is embodied as a rectangular wave signal with one tenth of the transmission rate.

The second passive subscriber 200 comprises a second phase controller 231. The second phase controller 231 is connected to the first receive connection 201 and is set up to generate the clock 303 synchronous to the transmit-receive clock 301 and the sampling clock 302 from the transmitted encoded static pattern 307. The sampling clock 302 may comprise a data rate identical to the data clock of the first passive subscriber 100. The synchronous clock 303 may be output via a third clock line 232. The sampling clock 302 may be output via a fourth clock line 233. The third clock line 232 connects the second phase controller 231 to the first receive SERDES element 211, the second receive SERDES element 212, and the decoding unit 221. The second phase controller 231 may be configured as a PLL.

It may be provided that the first phase offset of the synchronous clock 303 is 90 degrees. It may be provided that the second phase offset of the sampling clock 302 is 18 degrees.

The sampling clock 302 is passed to the first receive SERDES element 211 and the second receive SERDES element 212 via the fourth clock line 233. Based on the sampling clock 302, the individual bits of the encoded static pattern 307 in the first receive SERDES element 211 and the encoded user data 314 in the second receive SERDES element 212 may be sampled, each of which is combined into a receive data word using the synchronous clock 303.

The static pattern 308 decoded by the first receive SERDES element 211 may be forwarded to a clock recovery unit 234 of the second passive subscriber 200. This allows for a coarse adjustment of the receive data words. For this purpose, the static pattern 308 decoded by the first receive SERDES element 211 may be shifted with the aid of a first shift register until the original static pattern 306 is output at an output of the first receive SERDES element 211, and further the receive data word decoded by the second receive SERDES element 212 may be shifted by a number of bits identical to the first shift register with the aid of a second shift register. The clock recovery unit 234 is also connected to the third clock line 232. The first shift register may thereby be integrated into the second passive subscriber 200 and there, in particular, into the first receive SERDES element 211. The second shift register may be integrated in the second passive subscriber 200 and there in particular in the second receive SERDES element 212.

The second passive subscriber 200 further comprises a first delay element 241 and a second delay element 242. The encoded static pattern 307 is delayed by the first delay element 241 and the encoded user data 314 is delayed by the second delay element 242. Here, as shown in FIG. 1, it may be provided that the encoded static pattern 307 passed to the second phase controller 231 is not passed through the first delay element 241 and thus reaches the second phase controller 231 without delay. During an initialization, the delay of the first delay element 241 and of the second delay element 242 is first gradually reduced and a check is carried out to see if a sampled clock pattern changes.

Thus, a lower limit for the delay is determined. Subsequently, the delay of the first delay element 241 and the second delay element 242 is gradually increased, and it is checked whether a sampled clock pattern changes. Thus, an upper limit for the delay is determined. Then, the delay of the first delay element 241 and of the second delay element 242 is set to an average of the lower limit and the upper limit. An alternative possibility is, when a period of the clock pattern and a lower limit or an upper limit of the clock pattern are known, respectively, to set the sampling offset by half a period with regard to the known lower or upper limit.

The first passive subscriber 100 comprises a first FIFO element 151. The first FIFO element 151 is connected to the active subscriber 10 via a transmit data line 152 and a first control line 153. In this context, the transmit data line 152 and the first control line 153 may also be routed via further passive subscribers, in contrast to the illustration of FIG. 1. The first FIFO element 151 is set up to forward a telegram received via the transmit data line 152 and, if applicable, control signals received via the first control line 153 to the encoding unit 121 according to the "first-in-first-out" principle. The second passive subscriber 200 comprises a second FIFO element 251. The second FIFO element 251 is provided with a receive data line 252 and a second control line 253. The second FIFO element 251 is set up to forward on a telegram received from the decoding unit 221 via the received data line 252, as the case may be, received control signals via the second control line 253 according to the first-in-first-out principle.

It may be provided that the first transmit connection 101, the second transmitting connection 102, the first receive connection 201 and the second receive connection 202 are configured as terminals, with the first double line 11 and the second double line 12 each being configured as a cable connection. In this case, the first passive subscriber 100 and the second passive subscriber 200 may be arranged in different housings.

Alternatively, it may be provided that the first transmit connection 101, the second transmit connection 102, the first receive connection 201, the second receive connection 202, the first double line 11 and the second double line 12 are embodied as conductor paths on a circuit board. In this case, the first passive subscriber 100 and the second passive subscriber 200 may be arranged in a shared housing.

Within the first subscriber 100, the involved components, i.e., the first transmit SERDES element 111, the second transmit SERDES element 112, the encoding unit 121, the first phase controller 131, and the first FIFO element 151, may entirely or partially be arranged within a field programmable gate array (FPGA). Within the second subscriber 200, the involved components, i.e., the first receive SERDES element 211, the second receive SERDES element 212, the decoding unit 221, the second phase controller 231, the clock recovery unit 234, the first delay element 241, the second delay element 242, and the second FIFO element 251 may entirely or partially be arranged within a programmable logic gate. Instead of the programmable logic gate, an application-specific integrated circuit (ASIC) may be used for the first passive device 100 and for the second passive device 200.

Figure 2:
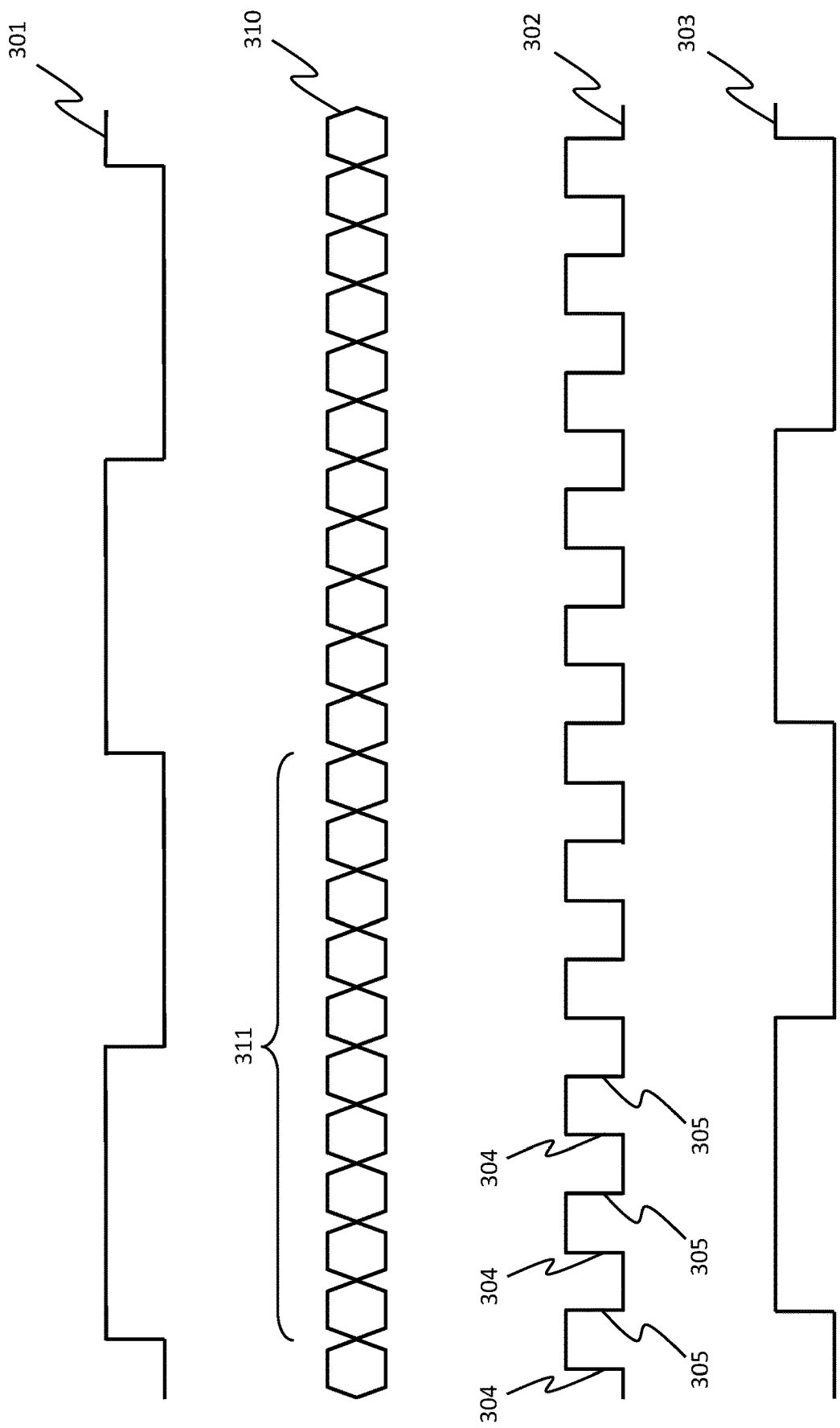
FIG. 2 shows clocks and user data during a communication.

FIG. 2 shows, arranged one above the other, a transmit-receive clock 301, user data 310, a sampling clock 302 and a synchronous clock 303, in each case during the execution of the method for communicating between the first passive subscriber 100 and the second passive subscriber 200 of the bus system 1. The transmit-receive clock 301 comprises the bit sequence 1111100000, i.e. five times the bit value 1 followed by five times the bit value 0. A transmit data word 311 consisting of ten bits is output synchronously with the transmit-receive clock 301 as part of the user data 310. The synchronous clock 303 is out of phase with the transmit-receive clock 301 by 18 degrees, since this makes it possible to achieve that the user data 310 is always sampled in the data eyes. The sampling clock 302 has a frequency five times that of the transmit-receive clock 301 or synchronous clock 303, in which case the user data 310 is sampled on both the rising edges 304 and the falling edges 305.

Figure 3:
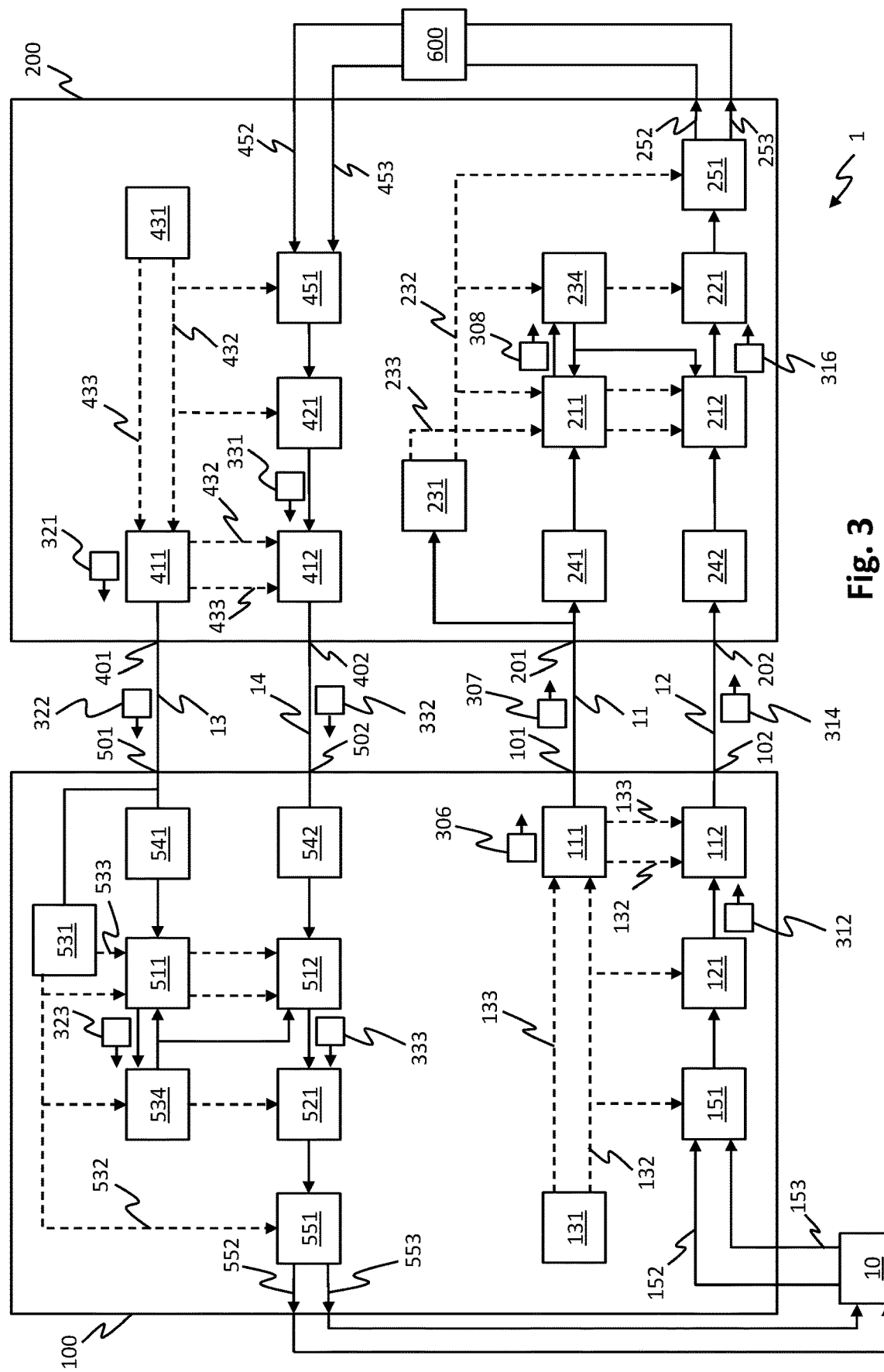
FIG. 3 shows a further bus system.

FIG. 3 shows a bus system 1 corresponding to the bus system 1 of FIG. 1, unless differences are described below. The second passive subscriber 200 comprises a further first transmit connection 401 for a further first differential double line 13, a further second transmit connection 402 for a further second differential double line 14, a further first transmit SERDES element 411 and a further second transmit SERDES element 412. The second passive subscriber 200 is set up to encode a further original static pattern 321 consisting of the predetermined bit length in the further first transmit SERDES element 411 and to transmit it via the further first transmit connection 401 as a further encoded static pattern 322, wherein the further original static pattern 321 defines a further transmit-receive clock. Furthermore, the second passive subscriber 200 is set up to encode further original user data 331 synchronized in time with the further original static pattern 321 in the further second transmit SERDES element 412 and to transmit it via the further second transmit connection 402 as further encoded user data 332, the further original user data 332 comprising a further transmit data word having the predetermined bit length.

The first passive subscriber 100 comprises a further first receive connection 501 for the further first differential double line 13, a further second receive connection 502 for the further second differential double line 14, a further first receive SERDES element 511 and a further second receive SERDES element 512. The first passive subscriber 100 is set up to receive the further encoded static pattern 322 via the further first receive connection 501, and to receive the further encoded user data 332 via the further second receive connection 502. The first passive subscriber 100 is set up to generate a further sampling clock and a further clock synchronous to the further transmit-receive clock from the further encoded static pattern 322, wherein the further sampling clock has a further first phase offset to the further transmit-receive clock and the further synchronous clock has a further second phase offset to the further transmit-receive clock.

The further sampling clock and the further synchronous clock may in this context be part of a further decoded static pattern 323. The first passive subscriber 100 is set up to decode the further encoded static pattern 322 with the aid of the further first receive SERDES element 511 to obtain the further decoded static pattern 323, and further arranged to decode the further encoded user data 332 with the aid of the further second receive SERDES element 512 to obtain a further receive data word as part of further decoded user data 333. The further first receive SERDES element 511 and the further second receive SERDES element 512 may be operated based on the further sampling clock, wherein the further receive data word may be output synchronously with the further synchronous clock.

Furthermore, FIG. 3 shows that the second passive subscriber 200 optionally comprises a further first phase controller 431, a further first clock line 432, a further second clock line 433, a further first FIFO element 451, a further transmit data line 452 and a further first control line 453, which may be configured analogously to the first phase controller 131, the first clock line 132, the second clock line 132, the first FIFO element 151, the first transmit data line 152 and the first control line 153, respectively, of the first passive subscriber 100 and may assume identical functions. In addition, the first passive subscriber 100 comprises a further second phase controller 531, a further third clock line 532, a further fourth clock line 533, a further clock recovery unit 534, a further first delay element 541, a further second delay element 542, a further second FIFO element 551, a further receive data line 552 and a further second control line 553, which may assume identical functions analogously to the second phase controller 231, the third clock line 232, the fourth clock line 233, the clock recovery unit 234, the first delay element 241, the second delay element 242, the second FIFO element 251, the receive data line 252 and the second control line 253, respectively.

Thus, in the bus system 1 of FIG. 3, communication from the first passive subscriber 100 to the second passive subscriber 200 takes place via the first differential double line 11 and the second differential double line 12, while communication from the second passive subscriber 200 to the first passive subscriber 100 takes place via the further first differential double line 13 and the further second differential double line 14. Also shown in FIG. 3 is a further passive subscriber 600 of the bus system 1, wherein the receive data line 252 and the second control line 253 are routed via the further passive subscriber 600 to the further transmit data line 452 and to the further first control line 453. The further receive data line 552 and the further second control line 553 are connected to the active subscriber 10. A data telegram transmitted by the active subscriber 10 may thus be transmitted from the first passive subscriber 100 to the second passive subscriber 200 via the first differential double line 11 and the second differential double line 12, then pass through the further passive subscriber 600 (or also a plurality of further passive subscribers) and then be transmitted from the second passive subscriber 200 to the first passive subscriber 100 via the further first differential double line 13 and the further second differential double line 14. From the first passive subscriber 100, the data telegram then again reaches the active subscriber 10. Thus, a communication structure corresponding to the EtherCAT standard is possible.

In particular, it may be provided that the transmit-receive clock 301 and the further transmit-receive clock have the same frequency. Furthermore, it is also possible that the sampling clock 302 and the further sampling clock have the same frequency.

TABLE 1

List of reference numerals

| | |
|---|---|
| 1 | bus system |
| 10 | active subscriber |
| 11 | first differential double line |
| 12 | second differential double line |
| 13 | further first differential double line |
| 14 | further second differential double line |
| 100 | first passive subscriber |
| 101 | first transmit connection |
| 102 | second transmit connection |
| 111 | first transmit SERDES element |
| 112 | second transmit SERDES element |
| 121 | coding unit |
| 131 | first phase controller |
| 132 | first clock line |
| 133 | second clock line |
| 151 | first FIFO element |
| 152 | transmit data line |
| 153 | first control line |
| 200 | second passive subscriber |
| 201 | first receive connection |
| 202 | second receive connection |
| 211 | first receive SERDES element |
| 212 | second receive SERDES element |
| 221 | decoding unit |
| 231 | second phase controller |
| 232 | third clock line |
| 233 | fourth clock line |
| 234 | clock recovery unit |
| 241 | first delay element |
| 242 | second delay element |
| 251 | second FIFO element |
| 252 | receive data line |
| 253 | second control line |
| 301 | transmit-receive clock |
| 302 | sampling clock |
| 303 | synchronous clock |
| 304 | rising edge |
| 305 | falling edge |
| 306 | original static pattern |
| 307 | encoded static pattern |

TABLE 1-continued

List of reference numerals

| | |
|---|---|
| 308 | decoded static pattern |
| 310 | user data |
| 311 | transmit data word |
| 312 | original user data |
| 314 | encoded user data |
| 316 | decoded user data |
| 321 | further original static pattern |
| 322 | further encoded static pattern |
| 323 | further decoded static pattern |
| 331 | further original user data |
| 332 | further encoded user data |
| 333 | further decoded user data |
| 401 | further first transmit connection |
| 402 | further second transmit connection |
| 411 | further first transmit SERDES element |
| 412 | further second transmit SERDES element |
| 421 | further encoding unit |
| 431 | further first phase controller |
| 432 | further first clock line |
| 433 | further second clock line |
| 451 | further first FIFO element |
| 452 | further transmit data line |
| 453 | further first control line |
| 501 | further first receive connection |
| 502 | further second receive connection |
| 511 | further first receive SERDES element |
| 512 | further second receive SERDES element |
| 521 | further decoding unit |
| 531 | further second phase controller |
| 532 | further third clock line |
| 533 | further fourth clock line |
| 534 | further clock recovery unit |
| 541 | further first delay element |
| 542 | further second delay element |
| 551 | further second FIFO element |
| 552 | further receive data line |
| 553 | further second control line |
| 600 | further passive subscriber |

The invention claimed is:

1. A method for communicating between a first passive subscriber and a second passive subscriber of a bus system, wherein a first differential double line and a second differential double line are used for the communication, wherein an original static pattern with a predetermined bit length is transmitted via the first differential double line, wherein the original static pattern defines a transmit-receive clock, wherein original user data are transmitted via the second differential double line, wherein the original user data comprise a transmit data word having the predetermined bit length, wherein the first passive subscriber encodes the original static pattern in a first transmit SERDES element and transmits it via the first differential double line as an encoded static pattern to the second passive subscriber, and encodes the original user data synchronized in time with the original static pattern in a second transmit SERDES element and transmits it via the second differential double line to the second passive subscriber as encoded user data, wherein the second passive subscriber receives the encoded static pattern and the encoded user data, wherein the second passive subscriber generates a sampling clock and a clock synchronous to the transmit-receive clock from the encoded static pattern, wherein the sampling clock has a first phase offset with regard to the transmit-receive clock, wherein the synchronous clock has a second phase offset with regard to the transmit-receive clock, wherein the second passive subscriber decodes the encoded static pattern with the aid of a first receive SERDES element and decodes the encoded user data with the aid of a second receive SERDES element, thus obtaining a receive data word, and wherein the first receive SERDES element and the second receive SERDES element are operated based on the sampling clock, wherein the receive data word is output synchronously with the synchronous clock.

2. The method according to claim 1, wherein the transmit-receive clock corresponds to one-tenth of a data rate transmitted over the first differential dual line or the second differential dual line, respectively.

3. The method according to claim 1, wherein the sampling clock corresponds to the data rate transmitted via the first differential double line or via the second differential double line, respectively, or corresponds to half of the data rate transmitted via the first differential double line or via the second differential double line, respectively.

4. The method according to claim 1, wherein the first phase offset is 90 degrees.

5. The method according to claim 1, wherein the second phase offset is 18 degrees.

6. The method according to claim 1, wherein the static pattern comprises a first number of first bits having a bit value of 1 and a second number of second bits having a bit value of 0, wherein in the static pattern, the first bits are arranged first and then the second bits are arranged, wherein the first number and the second number jointly correspond to the bit length.

7. The method according to claim 1, wherein the static pattern decoded by the first receive SERDES element is shifted with the aid of a first shift register until the original static pattern is output at an output of the first receive SERDES element, and wherein the receive data word decoded by the second receive SERDES element is shifted with the aid of a second shift register by a number of bits identical to the first shift register.

8. The method according to claim 1,
wherein the encoded static pattern in the second passive subscriber is delayed by a first delay element and the encoded user data are delayed by a second delay element, and
wherein, during initialization, the delay of the first delay element and the second delay element is first gradually reduced and it is checked whether a sampled clock pattern changes and thus a lower limit for the delay is determined, subsequently increasing the delay of the first delay element and the second delay element in a stepwise manner and checking whether a sampled clock pattern changes and thus an upper limit for the delay is determined, and subsequently setting the delay of the first delay element and the second delay element to an average value of the lower limit and the upper limit.

9. The method according to claim 1, wherein the user data is encoded and decoded using 8b10b encoding, wherein the predetermined bit length corresponds to 10 bits.

10. A first passive subscriber of a bus system, wherein the first passive subscriber comprises:
a first transmit connection for a first differential double line,
a second transmit connection for a second differential double line,
a first transmit SERDES element, and
a second transmit SERDES element;

wherein the first passive subscriber is configured to encode an original static pattern having a predetermined bit length in the first transmit SERDES element and to transmit it as an encoded static pattern via the first transmit connection, wherein the original static pattern defines a transmit-receive clock, and
is further configured to encode original user data in a time-synchronized manner with the original static pattern in the second transmit SERDES element and to transmit it via the second transmit connection as encoded user data, wherein the original user data comprise a transmit data word having the predetermined bit length.

11. A second passive subscriber of a bus system, wherein the second passive subscriber comprises:
a first receive connection for a first differential double line,
a second receive connection for a second differential double line,
a first receive SERDES element, and
a second receive SERDES element;
wherein the second passive subscriber is configured to receive an encoded static pattern having a predetermined bit length via the first receive connection and to receive encoded user data having the predetermined bit length via the second receive connection,
wherein the second passive subscriber is configured to generate a sampling clock and a clock synchronous with a transmit-receive clock from the encoded static pattern, the sampling clock having a first phase offset with respect to the transmit-receive clock, the synchronous clock having a second phase offset with respect to the transmit-receive clock, and
wherein the second passive subscriber is configured to decode the encoded static pattern with the aid of the first receive SERDES element and to decode the encoded user data with the aid of the second receive SERDES element to obtain a receive data word;
wherein the first receive SERDES element and the second receive SERDES element are operable based on the sampling clock, and wherein the receive data word is output synchronously with the synchronous clock.

12. The second passive subscriber according to claim 11, wherein the second passive subscriber is configured to shift the static pattern decoded by the first receive SERDES element with the aid of a first shift register, until the original static pattern is output at an output of the first receive SERDES element, and to shift the receive data word decoded by the second receive SERDES element by a number of bits identical to the first shift register with the aid of a second shift register.

13. The second passive subscriber according to claim 11, further comprising:
a first delay element between the first receive input and the first receiver SERDES element, and
a second delay element between the second receive input and the second receiver SERDES element,
wherein the encoded static pattern is delayable by the first delay element and the encoded user data is delayable by the second delay element,
wherein the second passive subscriber is configured, during initialization, to first reduce the delay of the first delay element and of the second delay element in a stepwise manner and to check whether a sampled clock pattern changes and thus determining a lower limit for the delay, subsequently to increase the delay of the first delay element and of the second delay element in a stepwise manner and to check whether a sampled clock pattern changes, thus determining an upper limit for the delay, and then to set the delay of the first delay element and the second delay element to an average value of the lower limit and the upper limit.

14. A bus system comprising a second passive subscriber according to claim 11, and further comprising:
   a first passive subscriber, wherein the first passive subscriber comprises a first transmit connection for a first differential double line,
   a second transmit connection for a second differential double line,
   a first transmit SERDES element, and
   a second transmit SERDES element;
   wherein the first passive subscriber is configured to encode an original static pattern having a predetermined bit length in the first transmit SERDES element and to transmit it as an encoded static pattern via the first transmit connection, wherein the original static pattern defines a transmit-receive clock, and
   is further configured to encode original user data in a time-synchronized manner with the original static pattern in the second transmit SERDES element and to transmit it via the second transmit connection as encoded user data, wherein the original user data comprise a transmit data word having the predetermined bit length.

15. The bus system according to claim 14,
   wherein the second passive subscriber comprises a further first transmit connection for a further first differential double line, a further second transmit connection for a further second differential double line, a further first transmit SERDES element and a further second transmit SERDES element,
   wherein the second passive subscriber is configured to encode a further original static pattern consisting of the predetermined bit length in the further first transmit SERDES element and to transmit it as a further encoded static pattern via the further first transmit connection, wherein the further original static pattern defines a further transmit-receive clock, and
   is further configured to encode further original user data in a time-synchronized manner with the further original static pattern in the further second transmit-SERDES element and to transmit it as further encoded user data via the further second transmit connection, the further original user data comprising a further transmit data word having the predetermined bit length;
   the first passive subscriber comprising a further first receive connection for the further first differential double line, a further second receive connection for the further second differential double line, a further first receive SERDES element and a further second receive SERDES element,
   wherein the first passive subscriber is configured to receive the further encoded static pattern via the further first receive connection and to receive the further encoded user data via the further second receive connection,
   wherein the first passive subscriber is configured to generate a further sampling clock and a further synchronous clock to the further transmit-receive clock from the further encoded static pattern, the further sampling clock having a further first phase offset with regard to the further transmit-receive clock, wherein the further synchronous clock has a further second phase offset to the further transmit-receive clock, and
   wherein the first passive subscriber is configured to decode the further encoded static pattern with the aid of the further first receive-SERDES element and to decode the further encoded user data with the aid of the further second receive-SERDES element and thus to obtain a further receive data word,
   wherein the further first receive SERDES element and the further second receive SERDES element are operable based on the further sampling clock, wherein the further receive data word is outputable synchronously with the further synchronous clock.

* * * * *